United States Patent
Langhorst et al.

(10) Patent No.: US 11,623,978 B2
(45) Date of Patent: Apr. 11, 2023

(54) POST-HARVEST METHOD FOR NATURAL FIBER NANOPARTICLE REINFORCEMENT USING SUPERCRITICAL FLUIDS

(71) Applicant: Ford Global Technologies, LLC, Dearborn, MI (US)

(72) Inventors: Amy Ellen Langhorst, Ann Arbor, MI (US); Deborah Frances Mielewski, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 342 days.

(21) Appl. No.: 16/885,591

(22) Filed: May 28, 2020

(65) Prior Publication Data

US 2021/0371604 A1    Dec. 2, 2021

(51) Int. Cl.
C08J 5/00 (2006.01)
C08K 3/013 (2018.01)
(Continued)

(52) U.S. Cl.
CPC ............ *C08J 5/005* (2013.01); *C08J 5/045* (2013.01); *C08K 3/013* (2018.01); *C08K 11/00* (2013.01);
(Continued)

(58) Field of Classification Search
CPC ..... C08J 5/005; C08J 5/045; C08J 5/24; C08J 5/245; C08J 9/0066; C08J 9/008; C08J 9/0085; C08J 2300/00; C08K 3/013; C08K 11/00; C08K 2201/001; C08K 2201/011; B82Y 30/00; B82Y 40/00; C08B 1/003

See application file for complete search history.

(56) References Cited

U.S. PATENT DOCUMENTS

| 5,340,614 A | 8/1994 | Perman et al. |
| 6,753,360 B2 * | 6/2004 | Mielewski ............... C08K 9/02 523/216 |

(Continued)

FOREIGN PATENT DOCUMENTS

| CN | 101270205 A | * | 9/2008 | ............... C08J 3/20 |
| CN | 101362827 A | * | 2/2009 | ............... C08J 3/00 |

(Continued)

OTHER PUBLICATIONS

Machine translation of CN 101270205 A to Qisi et al. published Sep. 24, 2008 (Year: 2008).*

(Continued)

*Primary Examiner* — Jane L Stanley
(74) *Attorney, Agent, or Firm* — Burris Law, PLLC

(57) ABSTRACT

A method of forming a composite material includes disposing dried plant material, nanoparticles, and a supercritical fluid in a vessel. A cellular structure of the dried plant material expands when disposed in the supercritical fluid and the nanoparticles migrate into and are embedded within the expanded cellular structure of the disposed dried plant material. The disposed dried plant fibers with embedded nanoparticles are removed from the vessel and mixed with a polymer to form a polymer-nanoparticle mixture. A chemical additive can be added to the supercritical fluid and the chemical additive can remove at least one of hemicellulose, lignin and pectins from the dried plant material.

19 Claims, 6 Drawing Sheets

(51) Int. Cl.
*C08K 11/00* (2006.01)
*C08J 5/04* (2006.01)
*B82Y 30/00* (2011.01)
*B82Y 40/00* (2011.01)

(52) U.S. Cl.
CPC ............. *B82Y 30/00* (2013.01); *B82Y 40/00* (2013.01); *C08J 2300/00* (2013.01); *C08K 2201/011* (2013.01)

(56) References Cited

U.S. PATENT DOCUMENTS

| | | | |
|---|---|---|---|
| 8,926,933 | B2 | 1/2015 | Zhang et al. |
| 8,969,225 | B2 | 3/2015 | Shah et al. |
| 2003/0072716 | A1 | 4/2003 | Poovathinthodiyil et al. |
| 2012/0047665 | A1* | 3/2012 | Yager .................. D06P 5/2066 8/444 |
| 2012/0301812 | A1 | 11/2012 | Zheng et al. |
| 2019/0276670 | A1* | 9/2019 | Langhorst ................ A01C 1/06 |

FOREIGN PATENT DOCUMENTS

| | | | | |
|---|---|---|---|---|
| CN | 107129632 | A | * 9/2017 | ................ C08J 5/06 |
| KR | 20090090658 | | 8/2009 | |

OTHER PUBLICATIONS

CN 101362827 A to Qisi et al. published Feb. 11, 2009 (Year: 2009).*
CN 107129632 A to Zha et al. published Sep. 5, 2017 (Year: 2017).*
Seghini et al. "environmentally friendly surface modification treatment of flax fibers by supercritical carbon dioxide", Molecules, 2020, 25, 438. published Jan. 21, 2020 (Year: 2020).*
Kern et al. "mechanical behavior of microcellular, natural fiber reinforced composites at various strain rates and temperatures" Polymer Testing, 37, 2014, 148-155. Published online Jun. 4, 2014 (Year: 2014).*
Iduma et al. "hibiscus cannabinus fiber/pp based on nano-biocomposites reinforce with graphene nanoplatelets", Journal of Natural Fibers, 2017, vol. 14, No. 5, 691-706. published Feb. 17, 2017 (Year: 2017).*

* cited by examiner

POST-HARVEST METHOD FOR NATURAL
FIBER NANOPARTICLE REINFORCEMENT
USING SUPERCRITICAL FLUIDS

FIELD

The present disclosure relates to natural fiber nanoparticle reinforcement.

BACKGROUND

The statements in this section merely provide background information related to the present disclosure and may not constitute prior art.

Natural fibers have been investigated for use as reinforcements in polymer matrix composites due to their low density, lower cost, and lower abrasiveness relative to other synthetic fiber reinforcements such as glass or carbon. However, their strength, modulus, and degradation temperatures are lower than synthetic fibers, and natural fibers also have a tendency to absorb moisture. Lower mechanical properties as well as poor interfacial bonding between the fiber and matrix due to opposing polarities generally results in a non-structural composite.

Nanoparticle reinforced polymers have also been of interest in recent years, due to the ability of a very small quantity of filler/reinforcement to result in significant property improvements. However, nanoparticles tend to aggregate during processing, resulting in poor dispersion within the composite matrix. Additionally, nanoparticles are generally classified as hazardous substances, requiring special handling during processing.

These challenges with natural fiber and nanoparticle reinforced composites are addressed by the present disclosure.

SUMMARY

In one form of the present disclosure, a method of forming a composite material includes disposing dried plant material and nanoparticles in a supercritical fluid. A cellular structure of the dried plant material expands when disposed in the supercritical fluid and the nanoparticles migrate into and are embedded within the expanded cellular structure of the disposed dried plant material. In some variations disposing the dried plant material and the nanoparticles in the supercritical fluid includes flowing the supercritical fluid into a vessel containing the dried plant material and the nanoparticles. In other variations disposing the dried plant material and the nanoparticles in the supercritical fluid includes flowing the supercritical fluid and the nanoparticles into a vessel containing the dried plant material. In at least one variation the supercritical fluid is supercritical $CO_2$.

In some variations the method further includes adding a chemical additive to the supercritical fluid and the chemical additive removes at least one of hemicellulose, lignin and pectins from the dried plant material.

In at least one variation the dried plant material is a sheet of dried plant material, while in some variations the dried plant material comprises individual plant cells.

In some variations the nanoparticles are selected from the group consisting of carbon-based nanoparticles, metals and/or metal oxide nanoparticles, polymer nanoparticles, inorganic nanoparticles, functionalized nanoparticles, carbon coated metal nanoparticles, and combinations thereof. Also, the dried plant material is selected from the group consisting of zucchini, corn, tomato, soybean, bitter melon, rapeseed, radish, ryegrass, lettuce, cucumber, cabbage, red spinach, faba bean, *arabidopsis*, carrot, onion, barley, rice, switchgrass, tobacco, wheat, garden cress, sorghum, mustard, alfalfa, onobrychis, pumpkin, garden pea, leek, peppers, flax, ryegrass, barley, agave, cattail, mung bean, cotton, algae, lemna gibba, cilantro, squash, bean, grasses, *landoltia punctata, elsholtzia splendens, microcystis aeruginosa, elodea densa*, bamboo, cane, carnation, monocot or dicot, bast fibers, lily, sugar cane, monocot, *Brassica Rapa*, hemp, and combinations thereof.

In at least one variation the method further includes removing the disposed dried plant material with embedded nanoparticles from the supercritical fluid, drying the plant material with embedded nanoparticles, and mixing the plant material with embedded nanoparticles within a polymer matrix. In such a variation the method can include post-processing the dried plant material with embedded nanoparticles prior to mixing within the polymer matrix, and the post-processing includes at least on of chopping, winding, chemical treatment, heat treatment, washing, radiation treatment, and steam explosion, among others.

In some variations a part is formed of the composite material and a vehicle contains at least one part formed of the composite material.

In some variations the method further includes applying at least one of a magnetic field and an electric field to the dried plant material and the nanoparticles disposed in the supercritical fluid such that the nanoparticles migrate into and are embedded within the expanded cellular structure of the disposed dried plant material.

In another form of the present disclosure a method of forming a composite material includes disposing dried plant fibers, nanoparticles, and a $CO_2$ supercritical fluid in a vessel such that a cellular structure of the dried plant fibers expands, and the $CO_2$ supercritical fluid and the nanoparticles flow into the expanded cellular structure and the nanoparticles are embedded within the expanded cellular structure. The method includes reducing a pressure within the vessel such that the $CO_2$ supercritical fluid becomes a gas and removing the disposed dried plant fibers with embedded nanoparticles from the vessel. Also, the removed dried plant fibers with embedded nanoparticles are mixed with a polymer to form a polymer-nanoparticle mixture and a part is formed using the polymer-nanoparticle mixture.

In some variations disposing the dried plant material, the nanoparticles and the $CO_2$ supercritical fluid in the vessel includes placing the dried plant material and the nanoparticles in the vessel and then flowing the $CO_2$ supercritical fluid into the vessel. In other variations disposing the dried plant material, the nanoparticles and the $CO_2$ supercritical fluid in the vessel includes placing the dried plant material in the vessel and then flowing the $CO_2$ supercritical fluid and the nanoparticles into the vessel.

In at least one variation the method further includes adding a chemical additive to the $CO_2$ supercritical fluid and the chemical additive removes at least one of hemicellulose, lignin and pectins from the dried plant material. In such a variation, the chemical additive can be water.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
FIG. 1 is a side view of dried plant material used according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an innovative composite material that is formed from natural fibers (e.g., dried plant fibers) that have accumulated or embedded nanoparticles, in which the natural fibers have improved mechanical properties due to the presence of the nanoparticles. The composite material, i.e., the natural fibers with embedded nanoparticles, is combined with a polymer matrix to form a polymer-nanoparticle mixture which may be processed in any number of ways to create lightweight, strong, and sustainable parts, particularly for use in motor vehicles.

Figure 2A:
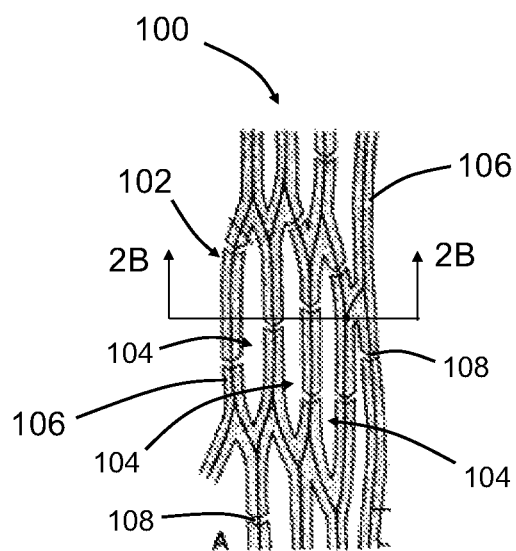
FIG. 2A is an enlarged view of detail 2 in FIG. 1.
Figure 2B:
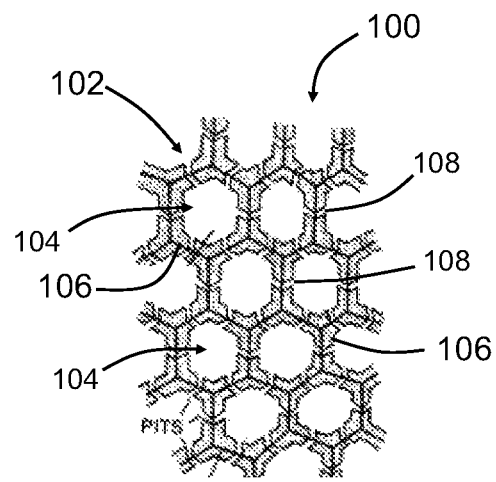
FIG. 2B is a cross sectional view of section 2B-2B in FIG. 2A.

Referring to FIGS. 1 and 2A-2B, dried plant material 10 is shown in FIG. 1 and an enlarged view of fibers 100 of the dried plant material 10 is shown in FIGS. 2A-2B. The fibers 100 have a cellular structure 102 (FIGS. 2A and 2B) that includes cells 104 defined by cell walls 106 and the cell walls 106 have pores and/or pits 108 (simply referred to herein as "pores"). It should be understood that the dried plant material 10 also includes other components (not shown) such as cellulose, hemicellulose, lignin and pectins, among others.

Figure 3:
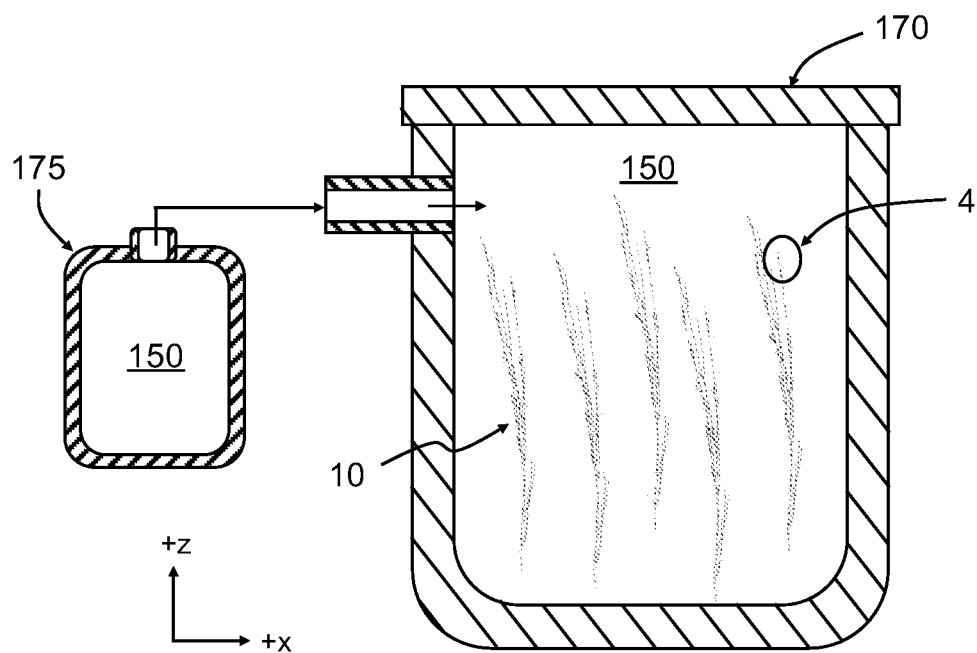
FIG. 3 is a cross-sectional side view of a vessel with dried plant material disposed in a supercritical fluid with nanoparticles according to one form of the present disclosure.
Figure 4A:
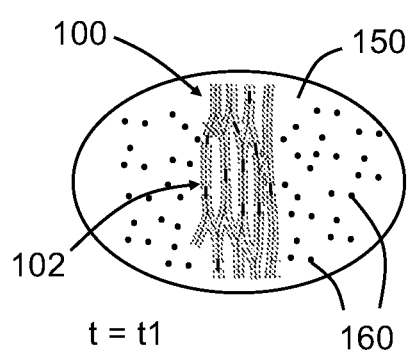
FIG. 4A is an enlarged view of detail 4 in FIG. 3 at a first time 't1' according to the teachings of the present disclosure.
Figure 4B:
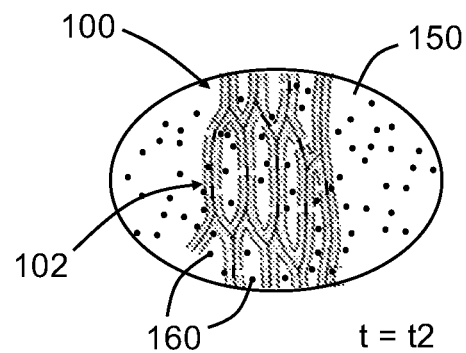
FIG. 4B is an enlarged view of detail 4 in FIG. 3 at a second time 't2' greater than the first time t1 according to the teachings of the present disclosure.

Referring now to FIG. 3, a step-up for a method of forming a composite material according to one form of the present disclosure is shown. The method includes disposing the dried plant material 10 (i.e., post-harvest) into a supercritical fluid 150 and nanoparticles 160 (FIGS. 4A-4B). Disposing the dried plant material 10 (also referred to herein simply as "disposed plant material 10") into the supercritical fluid 150 expands the cellular structure 102 of the fibers 100 such that the flow of the supercritical fluid 150 and the nanoparticles 160 through the fibers 100 is enhanced.

As shown in FIG. 3, the dried plant material 10, supercritical fluid 150, and nanoparticles 160 are disposed within a vessel 170. In some variations of the present disclosure, the supercritical fluid 150 is provided from a storage container 175. As used herein, the phrase "supercritical fluid" refers to a substance at a temperature and pressure above its critical point and where distinct liquid and gas phases do not exist. Accordingly, the vessel 170 is maintained at a pressure and a temperature above the critical point of the supercritical fluid 150. In some variations the supercritical fluid 150 is contained within the storage container 175 as shown in FIG. 3 and allowed to flow into the vessel 170, which is also maintained at a pressure and a temperature above the critical point of the supercritical fluid 150. In other variations, a gas from which the supercritical fluid 150 is formed flows (e.g., is pumped) from the storage container 175 into the vessel 170 and then the vessel 170 is pressurized and maintained at a temperature above the critical point of the supercritical fluid 150 such that the supercritical fluid 150 is formed and maintained within the vessel 170. Non-limiting examples of supercritical fluids include carbon dioxide ($CO_2$), methane ($CH_4$), ethane ($C_2H_6$), propane ($C_3H_8$), ethylene ($C_2H_4$), propylene ($C_3H_6$), methanol ($CH_3OH$), ethanol ($C_2H_5OH$), acetone ($C_3H_6$)) and nitrous oxide ($N_2O$).

In some variations, the nanoparticles 160 (FIGS. 4A-4B) are disposed within the vessel 170 before the supercritical fluid 150 and/or a gas that forms the supercritical fluid 150 flows into the vessel 170. In other variations, the nanoparticles are included with the supercritical fluid 150 and/or a gas that forms the supercritical fluid 150 when it flows into the vessel 170. In still other variations, the nanoparticles are added or disposed into the vessel 170 after the supercritical fluid 150 and/or gas that forms the supercritical fluid 150 flows into the vessel 170.

Referring now to FIGS. 4A-4B, an enlarged view of section 4 in FIG. 3 at a time 't1' is shown in FIG. 4A and an enlarged view of section 4 in FIG. 3 at a time 't2' greater than time t1 is shown in FIG. 4B. As shown in FIG. 4B, when comparing to FIG. 4A, the cellular structure 102 of the fibers 100 expands with time when exposed to the supercritical fluid 150. It should be understood that the expanded cellular structure 102 of the fibers 100 enhances the flow of the nanoparticles 160 into contact with and/or within the fibers 100, thereby providing fibers 100 of the dried plant material 10 with increased quantities of embedded nanoparticles 160 and a corresponding increase in at least one mechanical property.

In at least one variation, the supercritical fluid 150 is supercritical $CO_2$ and the vessel 170 is pressurized at a pressure equal to or greater than 1070 pounds per square inch (psi) (7.4 MPa) and maintained at a temperature equal to or greater than 31° C. Also, the time t1 is less than 5 minutes and the time t2 is greater than 5 minutes. In some variations, the time t2 is greater than 15 minutes. In at least one variation, the time t2 is greater than 15 minutes and less than 100 hours, for example the time t2 is greater than 30 minutes and less than 24 hours. In at least one variation, the time t2 is greater than 30 minutes and less than 12 hours, for example, time t2 is greater than 30 minutes and less than 6 hours, greater than 30 minutes and less than 4 hours, greater than 30 minutes and less than 3 hours, greater than 30 minutes and less than 2 hours, or greater than 30 minutes and less than 1 hour. In some variations, the time t2 is greater or equal to 1 hour and less than 12 hours, for example, time t2 is greater or equal to 1 hour and less than 6 hours, greater or equal to 1 hour and less than 4 hours, greater or equal to 1 hour and less than 3 hours, or greater or equal to 1 hour and less than 2 hours.

In some variations of the present disclosure, the nanoparticles 160 flow through the pores 108 of cell walls 106 such that nanoparticles 160 are embedded within individual cells 104. In other variations, the nanoparticles 160 flow between individual cells 104 such that nanoparticles 160 are embedded between individual cells 104 and/or on cell walls 106. In still other variations, the nanoparticles 160 flow through the pores 108 of cell walls 106 and between individual cells 104 such that nanoparticles 160 are embedded within individual cells 104 and embedded between individual cells 104 and/or on cell walls 106.

Figure 5:
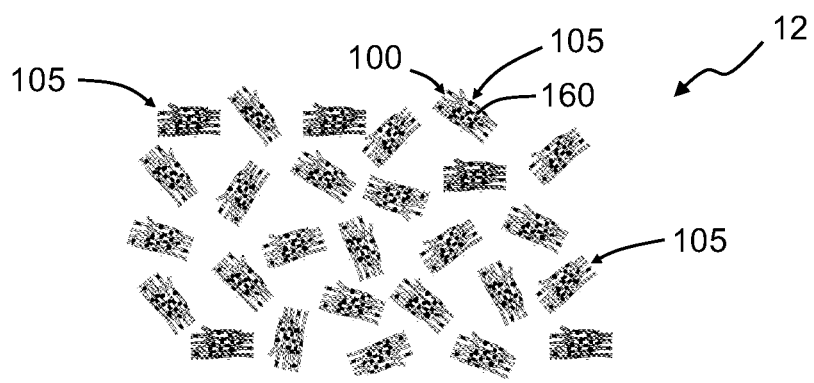
FIG. 5 is a side view of nanoparticles embedded within the plant material in FIG. 3 after being removed from the supercritical fluid according to the teachings of the present disclosure.

Referring now to FIG. 5, a composite material 12 in the form of a plurality of nanoparticle embedded fibers 105 comprising fibers 100 embedded with nanoparticles 160 is shown. For example, in some variations of the present disclosure the fibers 100 with embedded nanoparticles 160 are removed from the supercritical fluid 150 and post-processed to provide the plurality of nanoparticle embedded fibers 105. Non-limiting examples of post-processing the disposed plant material 10 with embedded nanoparticles 160 includes chopping, winding, chemical treatment (e.g., alkali treatment), heat treatment, washing, radiation treatment (e.g., UV, plasma, corona), and steam explosion, among others.

Non-limiting examples of the fibers 100 include fibers of dried plant material such as dried zucchini, corn, tomato, soybean, bitter melon, rapeseed, radish, ryegrass, lettuce, cucumber, cabbage, red spinach, faba bean, *arabidopsis*, carrot, onion, barley, rice, switchgrass, tobacco, wheat, garden cress, sorghum, mustard, alfalfa, onobrychis, pumpkin, garden pea, leek, peppers, flax, ryegrass, barley, agave, cattail, mung bean, cotton, algae, lemna gibba, cilantro, squash, bean, grasses, *landoltia punctata, elsholtzia splendens, microcystis aeruginosa, elodea densa*, bamboo, cane, carnation, monocot or dicot, bast fibers, lily, sugar cane, monocot, hemp, and *Brassica Rapa*, among others. Other non-limiting examples of fibers include wood derived fibers such as bast fibers. Also, non-limiting examples of nanoparticles 160 include carbon-based nanoparticles, metal and/or metal oxide nanoparticles, polymer nanoparticles, inorganic nanoparticles, functionalized nanoparticles, carbon coated metal nanoparticles, and combinations thereof. In variations where the nanoparticles are wrapped or tagged with a magnetic material, non-limiting examples of the magnetic material include nickel, iron, cobalt, and hematite ($Fe_2O_3$), among others.

Figure 6:
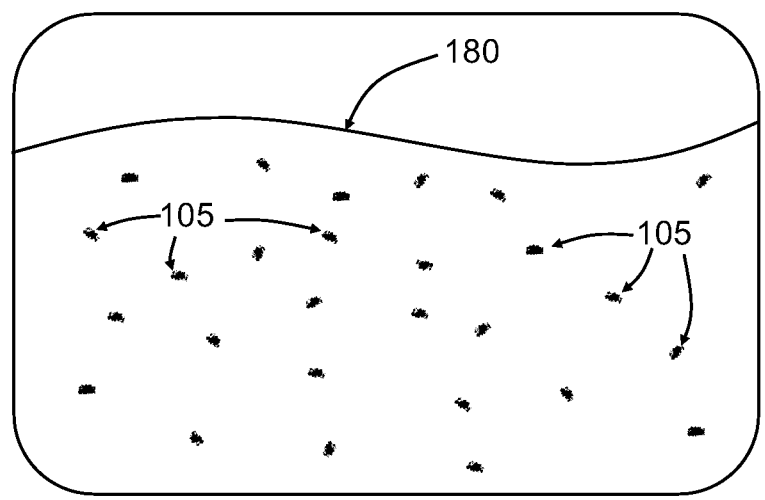
FIG. 6 is a side view of the plant material with embedded nanoparticles in FIG. 5 mixed with a liquid polymer to form a polymer-nanoparticle mixture according to the teachings of the present disclosure.
Figure 7:
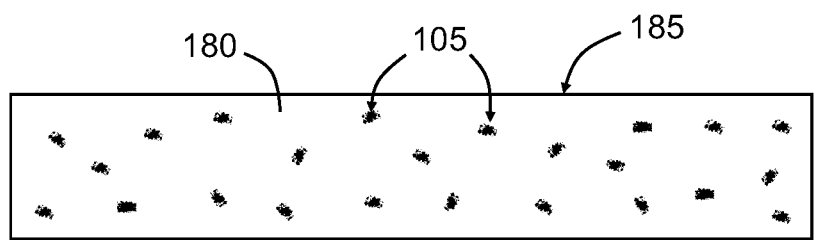
FIG. 7 is a side view of a component formed from the polymer-nanoparticle mixture in FIG. 6 according to the teachings of the present disclosure.

Referring now to FIGS. 6 and 7, steps for a method of forming a part from the composite material 12 according to the teachings of the present disclosure is shown. Particularly, the plurality of nanoparticle embedded fibers 105 shown in FIG. 5 is mixed within a polymer 180 (e.g., in liquid form) in FIG. 6 to form a polymer-nanoparticle mixture and the polymer-nanoparticle is used to form a part 185 in FIG. 7.

As shown in FIG. 7, the nanoparticle embedded fibers 105 are in a matrix of the polymer 180 (in solid form and also referred to herein as a "polymer matrix"). Non-limiting examples of the polymer 180 include thermoset or thermoplastics such as polyolefins, polyamides and polyurethanes, among others.

It should be understood that embedding the nanoparticles 160 within the fibers 100, and then mixing the nanoparticle embedded fibers 105 with the polymer 180 reduces agglomeration of the nanoparticles 160 within the polymer 180. That is, agglomeration of nanoparticles within liquids is known and treatment of nanoparticle surfaces to reduce agglomeration has been studied. However, agglomeration of plant fibers in liquids is less pronounced, when compared with agglomeration of nanoparticles, and embedding nanoparticles within plant fibers provides a polymer-nanoparticle composite with reduced nanoparticle agglomeration.

Figure 8:
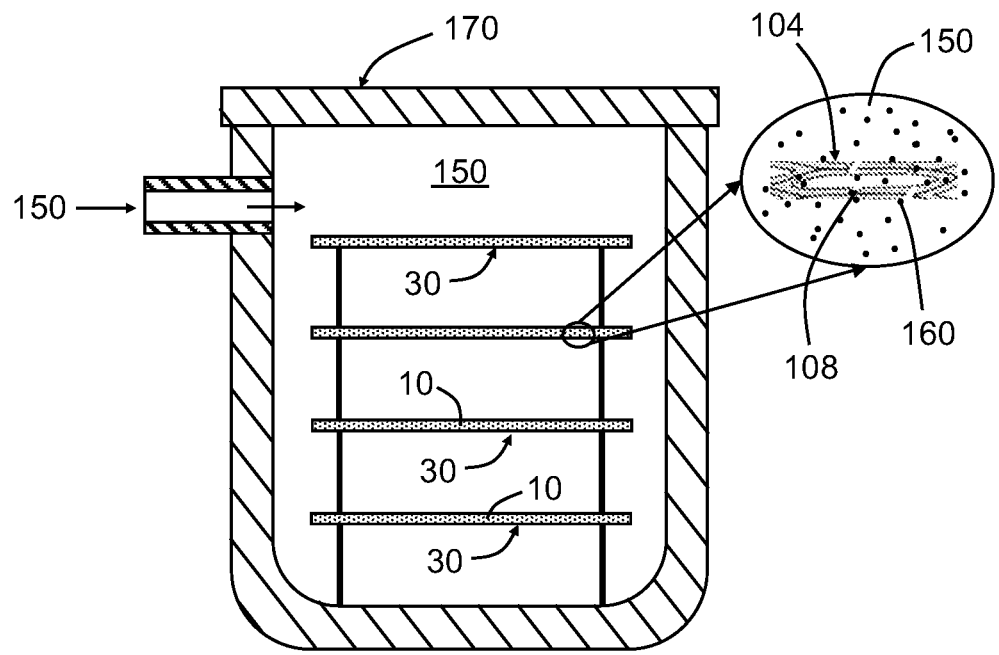
FIG. 8 is a cross-sectional side view of a vessel with dried plant material disposed in a supercritical fluid with nanoparticles according to another form of the present disclosure.

Referring now to FIG. 8, in another form of the present disclosure, one or more sheets 30 of the dried plant material 10 disposed within the supercritical fluid 150 containing the nanoparticles 160 is shown. Similar to the teachings above with respect to FIGS. 3-4B, disposing a sheet 30 into the supercritical fluid 150 expands the cellular structure 102 of the fibers 100 such that the nanoparticles 160 flow through the pores 108 of cell walls 106 and are embedded within individual cells 104.

It should be understood that the expanded cellular structure 102 of the fibers 100 that form the sheet 30 enhances the flow of the nanoparticles 160 into contact with and/or through the fibers 100. It should be also understood that the sheet 30 of disposed plant material 10 with embedded nanoparticles 160 is removed from the supercritical fluid and post-processed as discussed above with respect to FIGS. 5, 6 and/or 7.

Figure 9:
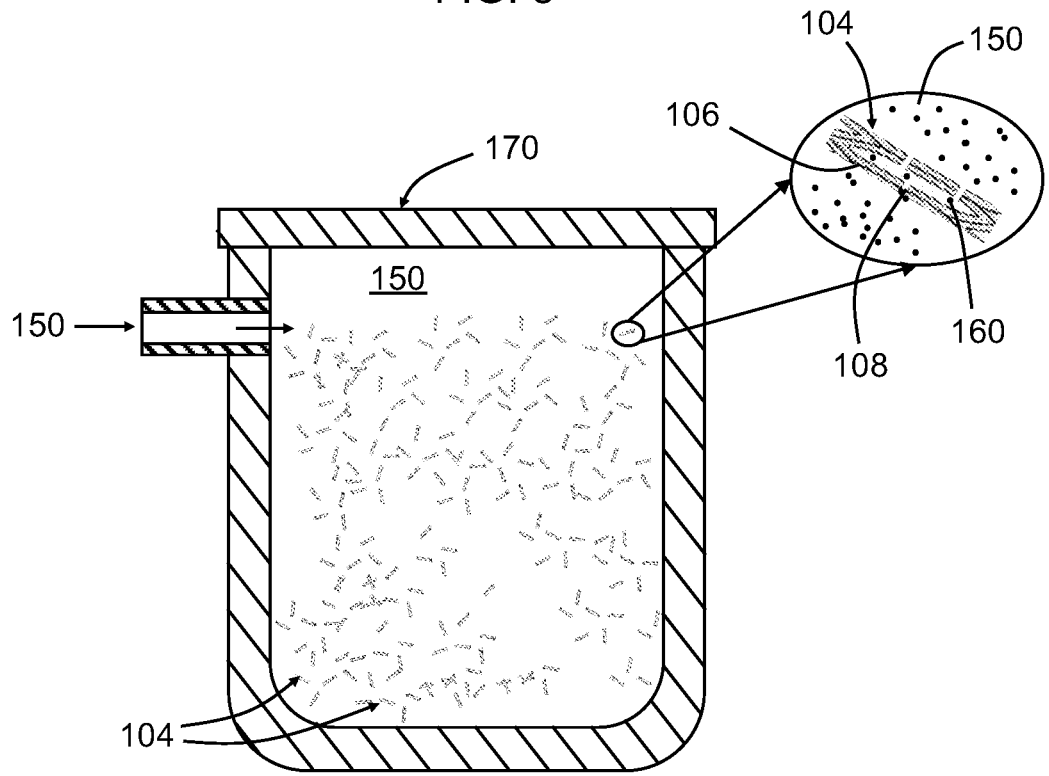
FIG. 9 is a cross-sectional side view of a vessel with dried plant material disposed in a supercritical fluid with nanoparticles according to still another form of the present disclosure.

Referring now to FIG. 9, in still another form of the present disclosure, individual cells 104 of the fibers 100 disposed in the supercritical fluid 150 containing the nanoparticles 160 is shown. Similar to the teachings above with respect to FIGS. 3-4B, disposing the individual cells 104 of the fibers 100 into the supercritical fluid 150 expands their cellular structure 102 such that enhanced flow of the nanoparticles 160 into contact with and/or through the individual cells 104 occurs.

In some variations of the present disclosure, the nanoparticles 160 flow through the pores 108 of cell walls 106 such that nanoparticles 160 are embedded within individual cells 104. In other variations, the nanoparticles 160 are embedded on the cell walls 106 of the individual cells 104. In still other variations, the nanoparticles 160 flow through the pores 108 of cell walls 106 and are embedded within individual cells 104, and are also embedded on cell walls 106. It should be understood that the expanded cellular structure 102 of the individual cells 104 enhances the flow of the nanoparticles 160 within the individual cells 104. It should also be understood that the cells 104 with embedded nanoparticles 160 are removed from the supercritical fluid and further processed as discussed above with respect to FIGS. 5, 6 and/or 7.

In some variations of the present disclosure, the supercritical fluid 150 includes a chemical additive that enhances removal of one or more components of the dried plant material 10. For example, in at least one variation, the chemical additive enhances the removal of hemicellulose, lignin and/or pectins from the dried plant material 10. Non-limiting examples of the chemical additive include water, alkali, a silane, acetylation, benzoylation, peroxide, sodium chlorite, acrylic acid, stearic acid, triazine, and a fungus or enzyme, among others. It should be understood that removing the one or more components of the dried plant material 10 enhances the flow of the supercritical fluid 150 and nanoparticles 160 through the fibers 100 thereby increasing the amount or number of nanoparticles embedded in the fibers 100.

Figure 10:
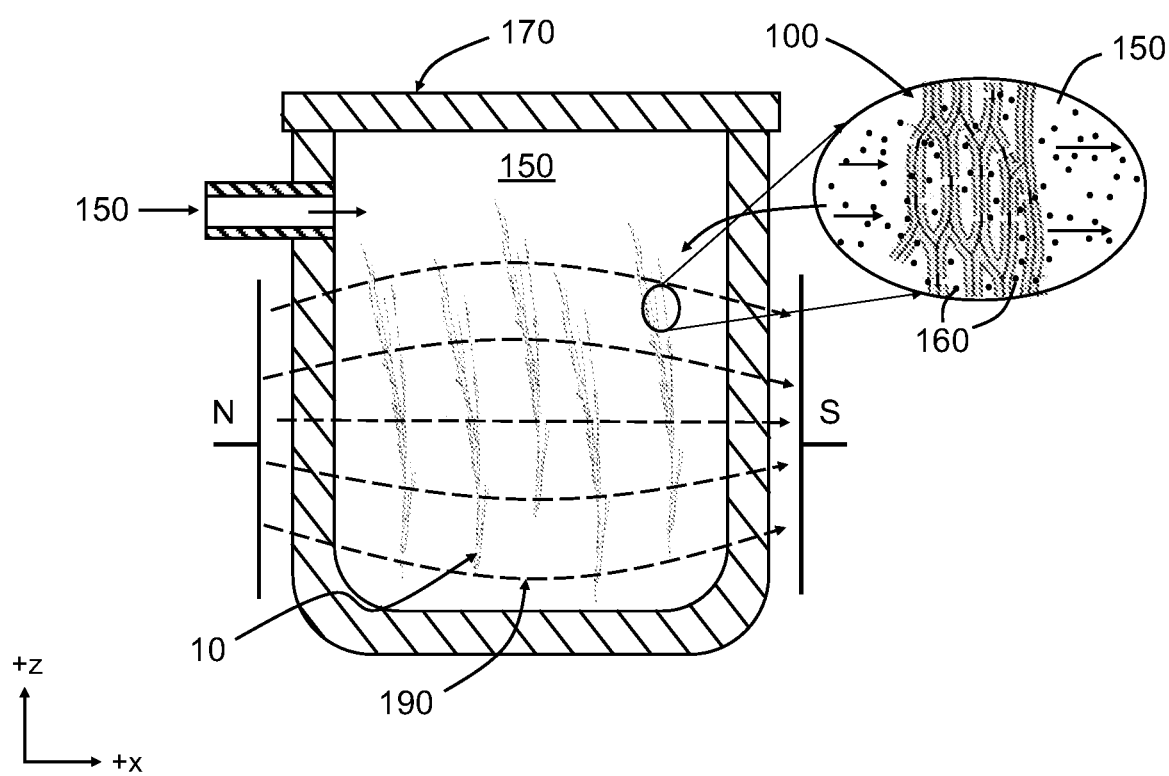
FIG. 10 is a cross-sectional side view of a vessel with dried plant material disposed in a supercritical fluid according to still yet another form of the present disclosure.

Referring now to FIG. 10, in still yet another form of the present disclosure, a method of forming a composite material includes applying a magnetic field 190 to the supercritical fluid 150 containing the nanoparticles 160 and the disposed plant material 10. In some variations of the present disclosure, the nanoparticles 160 are wrapped or tagged with a magnetic material. In such variations, the nanoparticles 160 respond to the magnetic field 190 by moving or migrating within the supercritical fluid 150 in a direction from a North pole 'N' of the magnetic field 190 towards a South pole 'S' of the magnetic field 190 as shown by the arrows in the figure (+x direction). Also, the nanoparticles 160 flow relative to the disposed plant material 10 such that the nanoparticles 160 move into contact with and/or within the fibers 100. Stated differently, the nanoparticles 160 become embedded in the fiber 100. In the alternative, or in addition to, an electric field (not labeled, but represented by the dotted arrow lines in FIG. 10) can be applied to the supercritical fluid 150 containing the nanoparticles 160 and the disposed plant material 10. Also, the nanoparticles 160, with or without being wrapped or tagged with a magnetic material, respond to the electric field by moving or migrating within the supercritical fluid 150 such that the nanoparticles 160 move into contact with and/or within the fibers 100.

It should be understood that in combination with the expanded cellular structure 102 of the fibers 100 resulting from the dried plant material 10 being disposed in the supercritical fluid 150, the magnetic field 190 enhances the flow of the nanoparticles 160 into contact with and/or through the fibers 100. Also, and while FIG. 10 shows the magnetic field 190 being applied to the supercritical fluid 150 from an exterior of the vessel 170, it should be understood that the magnetic field 190 and/or electric field discussed above can be applied to the supercritical fluid 150 from an interior of the vessel 170.

While FIG. 10 illustrates the magnetic field applied in only one direction, it should be understood that one or more magnetic fields can be applied in more than one direction. For example, an electric field applied across a supercritical fluid containing nanoparticles and dried plant material can be an alternating electric field such that a magnetic field alternates between one direction and an opposite direction (e.g., +/−x directions in FIG. 10). Also, one or more magnetic fields across a supercritical fluid containing nanoparticles and dried plant material can be rotated, e.g., the x, y and/or z axes in the figures, such that a magnetic field is applied in more than one direction across the supercritical fluid.

Figure 11:
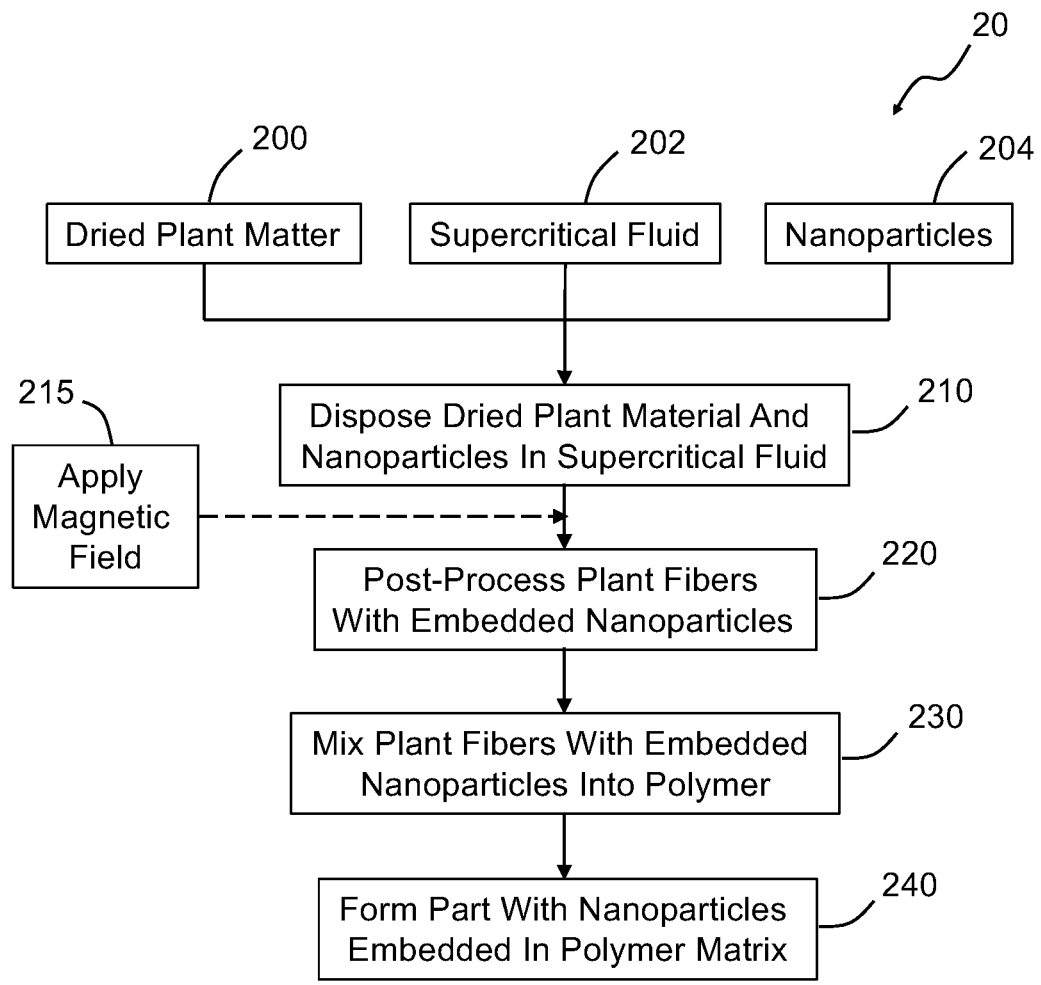
FIG. 11 is a flow chart for a method of forming a composite part according to the teachings of the present disclosure.

Referring now to FIG. 11, a flow chart for a method 20 of forming a composite material and a composite part is shown. The method includes providing dried plant material at 200, a supercritical fluid at 202, and nanoparticles at 204. In some variations of the present disclosure the supercritical fluid provided at 200 includes a chemical additive and/or the nanoparticles provided at 204 are magnetically tagged. The dried plant material is disposed in the supercritical fluid at 210 such that the cellular structure of the fibers of the dried plant material expands and the nanoparticles flow into and become embedded within the fibers of the dried plant material. In some variations, the nanoparticles are mixed with the supercritical fluid before the dried plant material is disposed in the supercritical fluid, while in other variations the nanoparticles are mixed with the supercritical fluid after the dried plant material is disposed in the supercritical fluid. Similarly, in variations where the supercritical fluid contains the chemical additive, in at least one variation, the chemical additive is mixed with the supercritical fluid before the dried plant material is disposed in the supercritical fluid, while in at least one other variation the chemical additive is mixed with the supercritical fluid after the dried plant material is disposed in the supercritical fluid. In variations where the chemical additive is added to the supercritical fluid, the chemical additive enhances removal of one or more components of the dried plant material (e.g., hemicellulose, lignin and/or pectins) such that the cellular structure of the fibers further expands compared to the expansion of the fiber cellular expansion resulting from being dispersed in the supercritical fluid alone.

Still referring to FIG. 11, in some variations a magnetic field (and/or electric field) is applied to the supercritical fluid with nanoparticles and disposed plant material at 215 such that embedding of the nanoparticles on the fibers of the dried plant material is enhanced. After the nanoparticles in the supercritical fluid are embedded in fibers of the disposed dried plant material, the nanoparticle embedded plant fibers are removed from the supercritical fluid and post-processed at 220 before mixing with a polymer at 230. Mixing the nanoparticle embedded plant fibers with the polymer forms a polymer-nanoparticle mixture and the polymer-nanoparticle mixture is used to form a part at 240 with nanoparticles embedded in a polymer matrix. In at least one variation of the present disclosure, the polymer-nanoparticle mixture is a liquid-nanoparticle mixture that is poured into a mold to make the part. In at least one other variation, the polymer-nanoparticle mixture is a liquid-nanoparticle mixture that is solidified, granulated and/or pulverized into granules and/or powder, and then used as injection molding material to make the part.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a composite material comprising: disposing dried plant material and nanoparticles in a supercritical fluid, wherein a cellular structure of the dried plant material expands when disposed in the supercritical fluid such that the nanoparticles migrate into and are embedded within the expanded cellular structure of the disposed dried plant material, further comprising applying at least one of a magnetic field and an electric field to the dried plant material and the nanoparticles disposed in the supercritical fluid such that the nanoparticles migrate into and are embedded within the expanded cellular structure of the disposed dried plant material, wherein the nanoparticles are wrapped or tagged with a magnetic material.

2. The method according to claim 1, wherein disposing the dried plant material and the nanoparticles in the supercritical fluid comprises flowing the supercritical fluid into a vessel containing the dried plant material and the nanoparticles.

3. The method according to claim 1, wherein disposing the dried plant material and the nanoparticles in the supercritical fluid comprises flowing the supercritical fluid and the nanoparticles into a vessel containing the dried plant material.

4. The method according to claim 1 further comprising introducing a chemical additive to the supercritical fluid, wherein the chemical additive removes at least one of hemicellulose, lignin and pectins from the dried plant material.

5. The method according to claim 1, wherein the dried plant material comprises a sheet of dried plant material.

6. The method according to claim 1, wherein the dried plant material comprises individual plant cells.

7. The method according to claim 1, wherein the nanoparticles are selected from the group consisting of carbon-based nanoparticles, metals and/or metal oxide nanoparticles, polymer nanoparticles, inorganic nanoparticles, functionalized nanoparticles, carbon coated metal nanoparticles, and combinations thereof.

8. The method according to claim 1, wherein the dried plant material is selected from the group consisting of zucchini, corn, tomato, soybean, bitter melon, rapeseed, radish, ryegrass, lettuce, cucumber, cabbage, red spinach, faba bean, *arabidopsis*, carrot, onion, barley, rice, switchgrass, tobacco, wheat, garden cress, sorghum, mustard, alfalfa, onobrychis, pumpkin, garden pea, leek, peppers, flax, agave, cattail, mung bean, cotton, algae, lemna gibba, cilantro, squash, bean, grasses, *landoltia punctata, elsholtzia splendens, microcystis aeruginosa, elodea densa*, bamboo, cane, carnation, monocot or dicot, bast fibers, lily, sugar cane, *Brassica Rapa*, hemp, and combinations thereof.

9. The method according to claim 1 further comprising removing the disposed dried plant material with embedded nanoparticles from the supercritical fluid, drying the plant material with embedded nanoparticles, and mixing the plant material with embedded nanoparticles within a polymer matrix.

10. The method according to claim 9 further comprising post-processing the dried plant material with embedded nanoparticles prior to mixing within the polymer matrix.

11. The method according to claim 10, wherein the post-processing comprises at least one of chopping, winding, chemical treatment, heat treatment, washing, radiation treatment, and steam explosion.

12. The method according to claim 1, wherein the supercritical fluid is supercritical $CO_2$.

13. A part formed of the composite material formed according to claim 1.

14. A vehicle having at least one part according to claim 13.

15. A method of forming a part from a composite material comprising:

disposing dried plant fibers, nanoparticles and a $CO_2$ supercritical fluid in a vessel, wherein a cellular structure of the dried plant fibers expands such that the $CO_2$ supercritical fluid and the nanoparticles flow into the expanded cellular structure and the nanoparticles are embedded within the expanded cellular structure;

reducing a pressure within the vessel such that the $CO_2$ supercritical fluid becomes a gas;

removing the disposed dried plant fibers with embedded nanoparticles from the vessel;

mixing the removed dried plant fibers with embedded nanoparticles with a polymer and forming a polymer-nanoparticle mixture; and forming a part using the polymer-nanoparticle mixture, wherein the part comprises the nanoparticles within a polymer matrix, further comprising applying at least one of a magnetic field and an electric field to the dried plant material and the nanoparticles disposed in the supercritical fluid such that the nanoparticles migrate into and are embedded within the expanded cellular structure of the disposed dried plant material, wherein the nanoparticles are wrapped or tagged with a magnetic material.

16. The method according to claim 15, wherein disposing the dried plant fibers, the nanoparticles and the $CO_2$ supercritical fluid in the vessel comprises at least one of:

placing the dried plant material and the nanoparticles in the vessel and then flowing the $CO_2$ supercritical fluid into the vessel; and placing the dried plant material in the vessel and then flowing the $CO_2$ supercritical fluid and the nanoparticles into the vessel.

17. The method according to claim 15, wherein:

the nanoparticles are selected from the group consisting of carbon-based nanoparticles, metals and/or metal oxide nanoparticles, polymer nanoparticles, inorganic nanoparticles, functionalized nanoparticles, carbon coated metal nanoparticles, and combinations thereof; and the dried plant material is selected from the group consisting of zucchini, corn, tomato, soybean, bitter melon, rapeseed, radish, ryegrass, lettuce, cucumber, cabbage, red spinach, faba bean, *arabidopsis*, carrot, onion, barley, rice, switchgrass, tobacco, wheat, garden cress, sorghum, mustard, alfalfa, onobrychis, pumpkin, garden pea, leek, peppers, flax, agave, cattail, mung bean, cotton, algae, lemna gibba, cilantro, squash, bean, grasses, *landoltia punctata, elsholtzia splendens, microcystis aeruginosa, elodea densa*, bamboo, cane, carnation, monocot or dicot, bast fibers, lily, sugar cane, *Brassica Rapa*, hemp, and combinations thereof.

18. The method according to claim 15 further comprising adding a chemical additive to the $CO_2$ supercritical fluid, wherein the chemical additive removes at least one of hemicellulose, lignin and pectins from the dried plant material.

19. The method according to claim 18, wherein the chemical additive is water.

\* \* \* \* \*